United States Patent
Vanhaelewyn et al.

(10) Patent No.: US 8,102,917 B2
(45) Date of Patent: Jan. 24, 2012

(54) VIDEO ENCODER USING A REFRESH MAP

(75) Inventors: Nicolas Vanhaelewyn, Suresnes (FR);
Cecile Dufour, Paris (FR)

(73) Assignee: NXP B.V., Eindhoven (NL)

( * ) Notice: Subject to any disclaimer, the term of this patent is extended or adjusted under 35 U.S.C. 154(b) by 1099 days.

(21) Appl. No.: 11/915,138

(22) PCT Filed: May 18, 2006

(86) PCT No.: PCT/IB2006/051577
§ 371 (c)(1),
(2), (4) Date: Nov. 20, 2007

(87) PCT Pub. No.: WO2006/123307
PCT Pub. Date: Nov. 23, 2006

(65) Prior Publication Data
US 2008/0253452 A1    Oct. 16, 2008

(30) Foreign Application Priority Data
May 20, 2005 (EP) .................... 05300392

(51) Int. Cl.
*H04N 7/12* (2006.01)
(52) U.S. Cl. .............. 375/240.16; 375/240.13
(58) Field of Classification Search ........ 375/240.1, 375/240.12, 240.13, 240.24, 240.16
See application file for complete search history.

(56) References Cited

U.S. PATENT DOCUMENTS

| | | | |
|---|---|---|---|
| 5,793,895 A | 8/1998 | Chang et al. | |
| 6,025,888 A | 2/2000 | Pauls | |
| 6,834,080 B1 * | 12/2004 | Furukawa et al. | 375/240.02 |
| 7,830,960 B2 * | 11/2010 | Liang et al. | 375/240.12 |
| 2003/0031128 A1 | 2/2003 | Kim et al. | |
| 2003/0086495 A1 | 5/2003 | Cheung | |
| 2003/0235249 A1 | 12/2003 | Zhao et al. | |

FOREIGN PATENT DOCUMENTS

| | | |
|---|---|---|
| EP | 0851685 A2 | 7/1998 |
| EP | 1178689 A1 | 2/2002 |
| GB | 2341064 A | 3/2003 |

* cited by examiner

*Primary Examiner* — Brenda H Pham

(57) ABSTRACT

The present invention relates to a video encoder (ENC) for encoding frames (FR) of a video signal before transmission, said video encoder (ENC) including an encoding decision unit (EDU) for deciding which kind of coding will be used for each data of said frame (FR) in an encoding unit (ENU). Said video encoder (ENC) further implements a freshness map calculation unit (FMCU) for calculating, throughout the time, for each data of said frame (FR), a corresponding freshness value (FV) taking into account Intra and Inter prediction mechanisms, independently from a calculation of a distortion. Said freshness value (FV) express on which degree encoded data (ED) are relying on previously transmitted data and said freshness value (FV) is used by said encoding decision unit (EDU).

17 Claims, 1 Drawing Sheet

VIDEO ENCODER USING A REFRESH MAP

FIELD OF THE INVENTION

The present invention relates to a video encoder for encoding frames of a video signal before transmission, said video encoder including an encoding decision unit for deciding which kind of coding will be used for each data of said frame in an encoding unit.

BACKGROUND OF THE INVENTION

Such a video encoder is known from the patent application US2003/0031128. This document discloses a method for performing adaptive intra refresh (it is here recalled that the word "Intra" generally designates a mode according to which all the macroblocks of a frame are processed independently of any other frame, i.e. without any reference to another frame, whereas the word "inter" designates a mode according to which at least another frame is used as a reference, i.e. either a preceding frame, or a subsequent frame, or both). An intercede distortion value and an intracode distortion value are calculated as are an intercode bitrate and an intracode bitrate. Based on a comparison of the calculated intercode distortion value and the intracode distortion value, and on a comparison of the intercede bit rate and the intracode bit rate for each macroblock, a decision is made as to which predicted frame macroblocks are to be intracoded. According to this document, a distortion value is thus calculated from residuals but also from previous distortion data.

Such a method implies complex calculations of distortion like, for example, in equation 22 presented in this document. Such an approach is probabilistic and presupposes the use of a concealment step in the decoder in order to evaluate the impact of the encoding decision.

SUMMARY OF THE INVENTION

Accordingly, it is an object of the invention to provide a video encoder able to take into account the impact of encoding decisions on the quality of the video signal when received without engendering complex calculations of distortion.

To this end, there is provided a video encoder implementing a freshness map calculation unit for calculating, throughout the time, for each data of said frame, a corresponding freshness value taking into account Intra and Inter prediction mechanisms independently from a calculation of a distortion, said freshness value expressing on which degree, once encoded, said data will rely on previously transmitted data, said freshness value being used by said encoding decision unit.

Such a freshness map that is calculated independently of any distortion just takes into account facts about the prediction mechanisms including Intra refresh and Inter prediction that were used from the last Intra refresh to reach said data to be encoded. Thus, such a freshness map takes into account all prediction mechanisms used to reach data from which said data have to be encoded from. Such a freshness map does not require complex calculation as freshness value are straightforward obtained from what kind of prediction mechanisms are used.

Said data of a frame can be a macroblock, a pixel or a sub-pixel data.

Said freshness value may be binary or be a discretized value in a given interval of values.

In an embodiment, said freshness map has the size of a frame.

Advantageously, said video encoder receiving a feedback of the transmission from a decoder to which encoded data are sent or from a transmission layer, said freshness value is dependent on whether the corresponding encoded data was properly transmitted.

Said freshness value may also be dependent on the freshness of the data in the reference frame from which the corresponding data of the frame will be predictively encoded.

Said freshness value may also be dependent on whether the corresponding data in the frame is intracoded.

The invention also relates to a method for encoding frames of a video signal before transmission, said method including an encoding decision step for deciding which kind of coding will be used for each data of said frame in an encoding step, said method further including a preliminary freshness map calculation step for calculating, throughout the time, for each data of said frame, a corresponding freshness value taking into account Intra and Inter prediction mechanisms, independently from the calculation of a distortion, said freshness value expressing on which degree encoded data are relying on previously transmitted data, said freshness value being used by said encoding decision step.

The invention also relates to a computer program product comprising program instructions for implementing, when said program is executed by a processor, an encoding method as disclosed above.

The invention finds application in visioconferencing systems, video telephony systems, telesurveillance systems, monitoring systems, streaming/broadcast systems in which a video encoder as described above is advantageously implemented.

BRIEF DESCRIPTION OF THE DRAWINGS

Additional objects, features and advantages of the invention will become apparent upon reading the following detailed description and upon reference to the accompanying drawings in which.

DETAILED DESCRIPTION OF THE INVENTION

In the following description, well-known functions or constructions by the person skilled in the art are not described in detail since they would obscure the invention in unnecessary detail.

Figure 1:
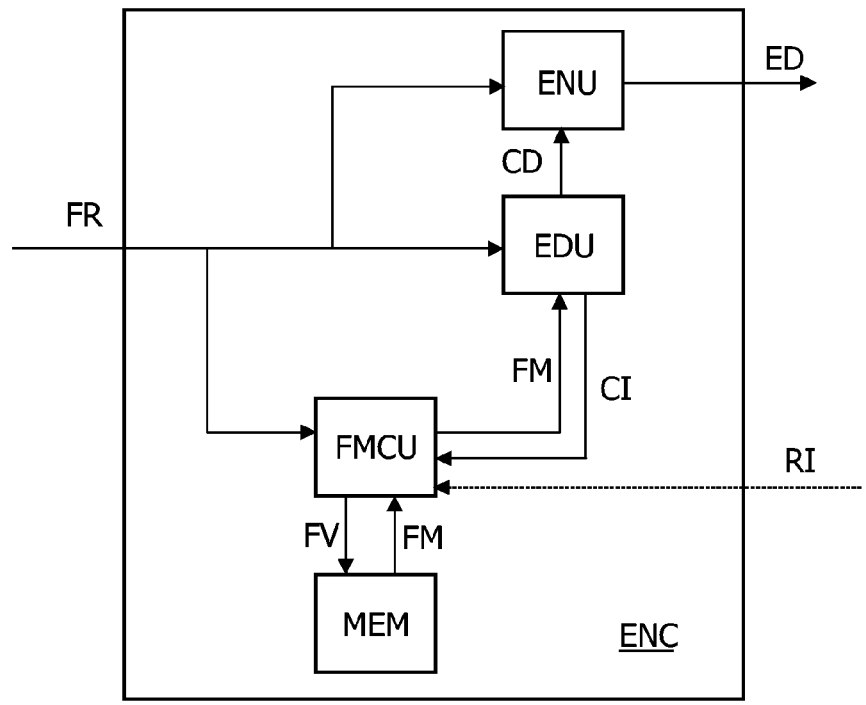
FIG. 1 illustrates a video encoder according to the invention.

FIG. 1 shows a schematic diagram of a video encoder ENC according to the invention. Said encoder ENC includes an encoding unit ENU for encoding data of a frame FR according to a coding decision CD received from an encoding decision unit EDU. Said coding decision CD is taken according to a freshness map FM calculated by a freshness map calculation unit FMCU. Said freshness map FM includes freshness value FV for each data of said frame FR. This calculation unit FMCU is advantageously linked to a memory MEM in order to store said freshness value FV.

The invention thus implements a building of a freshness map FM throughout the encoding process of any bitstream generated by a digital video encoder ENC.

For each new frame to encode, the freshness map calculation unit FMCU first initialises an array having a predefined size. Said array is called the freshness map or the map in the following.

Advantageously, the size is chosen in order to be the same as the size of the encoded frame. The size of said map FM may also be chosen to be a multiple or a fraction of the size of the frame. In a general case, any kind of size could be chosen. Such a choice depends on the granularity wished for said freshness map FM. Effectively, depending on the size of said map FM, each element of said map FM corresponds to a more or less extended amount of data in said frame. The freshness map FM can be indifferently stored in a compressed way or not.

Each element of the map FM corresponds to a discretized value from a set of values. Such set can be [0; 1] or any set of values defined, for example, by the interval [0; 255] or any other interval. For example, in the following, each element of said map FM is initiated at the highest value and each element is then updated by multiplying by a factor or by adding a factor that takes into account Intra and Inter prediction mechanisms through the encoding process of a data.

Then, for each element of the freshness map FM to which are related corresponding data of the frame, the freshness map calculation unit FMCU calculates to which extent the corresponding data in said frame are fresh or not.

In order to realize this function, said freshness map calculation unit FMCU receives coding information CI from said encoding decision unit EDU.

Such coding information CI includes information about whether the data of the frame will be predictively encoded from an area of a reference frame, about the freshness of this area, about the freshness of the motion vector, about whether the data will be predictively Intra coded.

Several corresponding freshness factors or values are defined as following:

$\alpha$ describes a freshness value or factor for Intra coded data. Several factors can be defined for the different possible dependencies encountered in MPEG-2, MPEG4, H.264.

Thus in the following $\alpha_{dc}$ represents the DC dependency (this factor is equal to 1 in MPEG-2, and is one choice out of two in MPEG-4), $\alpha_{ac}$ represents the AC dependency (none in MPEG-2, some in MPEG-4 if AC_flag is set to one), $\alpha_{pix}$ represents the pixel dependency encountered only in H.264 (up to 9 predictions directions).

$\beta$ describes a freshness factor for Inter coded data. Texture and motion dependencies are distinguished and the overall dependency is the sum of the both, with potential weighting factors $w_{tex}$ and $w_{mv}$.

Thus $\beta_{mv}$ represents the motion dependency when the vector sent is based on a prediction involving neighbouring vectors (for example, up to 3), $\beta_{res}$ represents the texture dependency that concerns P and B frames in MPEG-2 and MPEG-4 and multiple frame reference in H.264. $\beta_{res}$ depends on the motion vector by being higher when this vector is small because the eye is more critical on slowly moving areas and less critical on rapidly moving object. $\beta_{res}$ depends also on the residual by being higher when residual is small because sending some texture hides errors.

Figures 2A, 2B:
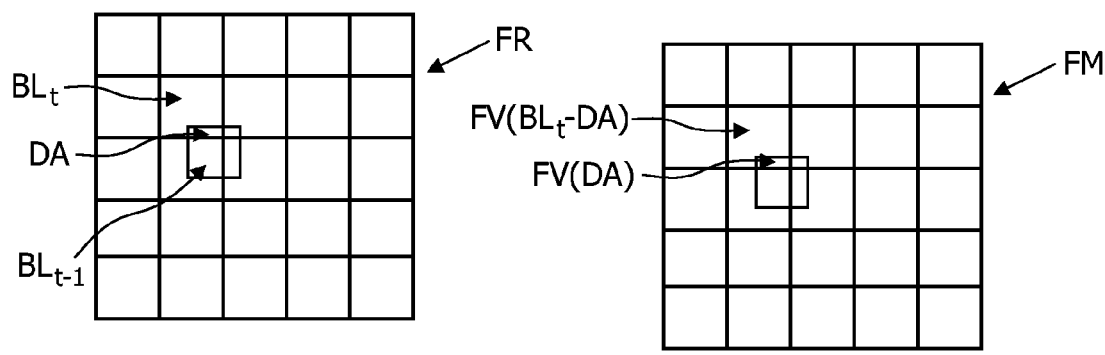
FIG. 2 gives an example of data of a frame concerned by the invention.

As illustrated on FIG. 2a, a macroblock $BL_t$ of the frame at time t is spread over various pixels (for example 16*16 pixels) and, as illustrated on this figure, can be partly predicted from another macroblock $BL_{t-1}$ of the previous frame displaced from an Inter prediction mechanism. When such a prediction occurs, as represented on FIG. 2a, the displaced macroblock $BL_{t-1}$ does not generally recover a macroblock of the frame FR at time t. Thus data DA from the macroblock $BL_t$ will have a freshness value FV that will differ from the values of other data of the macroblock $BL_t$.

Thus, as illustrated on FIG. 2b, the freshness map FM for each block or each group of pixel, as data DA, or each pixel or each sub-pixel estimation inside a macroblock $BL_t$ can lead to different freshness value FV. This fact is schematically illustrated by only two freshness values FV($BL_t$–DA) and FV(DA) for the data of the macrobloc $BL_t$. Moreover it is noted that the level of granularity of the freshness map FM is defined by its size regarding the size of the frame. On FIG. 2, the size of the freshness map FM is chosen to be equal to the size of the frame FR. Consequently the granularity of the freshness map FM can be the pixel.

The freshness map FM can be calculated in two levels or in multilevel. In such a multilevel approach, the invention assumes that some element of the freshness map FM cannot be affected to a 0 or 1 value and some intermediate discretized levels are defined.

Such intermediate levels are met when data of the frame is likely to be predictively encoded from a data having an intermediate corresponding freshness value FV, when data of the frame is likely to be predictively encoded from interpolated data which do not have the same freshness value FV. In this last case, the freshness of the current data is calculated as the pro rate of the freshness value FV on which it relies upon.

In an embodiment of the invention, the freshness map calculation unit FMCU receives reception information RI from a decoder or a transmission layer. Such reception information RI exists in case the encoder has a feedback on those data that were missing due to packet loss from said decoder or transmission layer. It gives information on whether a predicted data of a block or macroblock has been properly transmitted or not.

Examples of the calculation of a freshness value FV for Intra coded data and for Inter coded data are given below for an image labelled t in MPEG-4 and for freshness value updated by multiplication by a factor, that is an example of an operator.

For an intra coded data with coordinates [i,j] and DC coded against the upper neighbour and AC pred_flag set to 1, the freshness value FV is:

$$FV(i,j,t)=(\alpha_{dc}+\alpha_{ac})*FV(i,j-1,t)$$

with [i,j] referring to the coordinates in the image: for example, the second macroblock of size 16*16 of an image has a pixel coordinates of [16,0].

For an Inter coded data with coordinates [i,j], residual R and motion vector MV:

$$FV(i,j,t)=w_{tex}*FV_{tex}(i,j,t)+w_{mv}*FV_{mv}(i,j,t)$$

Where $FV_{tex}(i,j,t)=\beta_{res}(MV,R)*FV_{tex}(i-MV_x,j-MV_y,t-1)$

And $FV_{mv}(i,j,t)=\beta_{mv}*[FV_{mv}(i-1,j-1,t)+FV_{mv}(i,j-1,t)+FV_{mv}(i+1,j-1,t)]$.

The encoding decision unit EDU is free to act upon the freshness map FM of each incoming frame. It can apply some strategies among the following: Intra encoding of a macroblock, which sets the freshness value FV of the corresponding data at a high value, applying prediction mechanism favouring in some way the freshest data, applying other mechanisms taking advantages of the freshness map FM attached to each frame to maximise an average of the freshness value FV of each encoded frame. In this last case, it is provided a local control of the freshness value FV of each encoded frame, in order to maximize its average freshness.

The freshness value FV can be used as a unique mean of decision, the Intra refresh being decided as soon as a threshold is reached or can be used in an equation taking into account the bit rate and a classical distortion factor calculated from the residual. In this last case the equation that is considered to decide the kind of encoding is of the form:

$$E=\text{Distortion(Residual)}+\lambda*[\text{bit rate}]+\gamma*[FV].$$

Then, the kind of encoding that is decided corresponds to the one that minimizes this equation E.

The invention enables a digital video encoder to be capable of providing bitstreams with smooth bit rate variation (no periodic Intra frame), bitstreams with minimized recovery time when randomly accessed, bitstreams with minimized propagation error due to transmission corruption. The invention enables to characterize elements of the bitstream by their freshness and to allocate different priorities to them. The elements of the bitstream can thus be protected by unequal error protection before transmission, the freshest being the most protected.

The invention finds numerous applications among which transmission over network with poor quality service, generating packet losses or bit corruption, and access to a bitstream without random access points defined, as it is widely used in visio conferencing systems, or in some broadcast environment. Both systems, for the sake of smooth bit rate variation, might avoid to periodically introducing resynchronisation points, the invention allowing easy random access. Thus visio conferencing system, streaming and broadcast for TV and mobile applications are particularly concerned.

The invention provides the possibility to have a high granularity in terms of resolution and depth as the resolution in the calculation of the freshness map FM can reach sub-pixel accuracy and as the depth can reach few bits representation. Moreover the tracking using the freshness map FM is temporal and takes into account prediction capability of the video standards.

It is to be understood that the present invention is not limited to the aforementioned embodiments and variations and modifications may be made without departing from the spirit and scope of the invention as defined in the appended claims. In the respect, the following closing remarks are made.

There are numerous ways of implementing functions of the method according to the invention by means of items of hardware or software, or both, provided that a single item of hardware or software can carries out several functions. It does not exclude that an assembly of items of hardware or software or both carry out a function, thus forming a single function without modifying the method of processing the drift frequency in accordance with the invention.

Said hardware or software items can be implemented in several manners, such as by means of wired electronic circuits or by means of an integrated circuit that is suitable programmed respectively.

Any reference sign in the following claims should not be construed as limiting the claim. It will be obvious that the use of the verb "to include" and its conjugations do not exclude the presence of any other steps or elements besides those defined in any claim. The article "a" or "an" preceding an element or step does not exclude the presence of a plurality of such elements or steps.

The invention claimed is:

1. A video encoder for encoding frames of a video signal before transmission, said video encoder including an encoding decision unit for deciding which kind of coding will be used for each data of said frame in an encoding unit, said video encoder further implementing a freshness map calculation unit for calculating, throughout the time, for each data of said frame, a corresponding freshness value taking into account Intra and Inter prediction mechanisms, independently from a calculation of a distortion, said freshness value expressing on which degree encoded data are relying on previously transmitted data, said freshness value being used by said encoding decision unit.

2. A video encoder as claimed in claim 1, wherein said data of a frame is a macroblock.

3. A video encoder as claimed in claim 1, wherein said data of a frame is a pixel.

4. A video encoder as claimed in claim 1, wherein said data of a frame is a sub-pixel data.

5. A video encoder as claimed in claim 1 wherein said freshness value is binary.

6. A video encoder as claimed in claim 1, wherein said freshness value is a discretized value.

7. A video encoder as claimed in claim 1, wherein said freshness map has the size of a frame.

8. A video encoder as claimed in claim 1, receiving a feedback of the transmission from a decoder to which encoded data are sent or from a transmission layer and wherein said freshness value is dependent on whether corresponding encoded data was properly transmitted.

9. A video encoder as claimed in claim 1, wherein said freshness value is dependent on the freshness value of the data in the reference frame from which the corresponding data of the frame will be predictively encoded.

10. A video encoder as claimed in claim 1, wherein said freshness value is dependent on whether the corresponding data in the frame is intracoded.

11. A method for encoding frames of a video signal before transmission, said method including an encoding decision step for deciding which kind of coding will be used for each data of said frame in an encoding step, said method further including a preliminary freshness map calculation step for calculating, throughout the time, for each data of said frame, a corresponding freshness value taking into account Intra refresh and prediction mechanisms, independently from the calculation of a distortion, said freshness value expressing on which degree encoded data are relying on previously transmitted data, said freshness value being used by said encoding decision step.

12. A non-transitory computer program product comprising a computer readable medium stored thereon program instructions for implementing, when said program is executed by a processor, an encoding method as claimed in claim 1.

13. A visioconferencing system including a video encoder as claimed in claim 1.

14. A video telephony system including a video encoder as claimed in claim 1.

15. A telesurveillance system including a video encoder as claimed in claim 1.

16. A monitoring system including a video encoder as claimed in claim 1.

17. A streaming/broadcast system including a video encoder as claimed in claim 1.

* * * * *